United States Patent
Heinemann

[11] Patent Number: 6,017,151
[45] Date of Patent: Jan. 25, 2000

[54] BEARING ARRANGEMENT AND METHOD FOR MAKING IT

[75] Inventor: Rolf Heinemann, Lehre, Germany

[73] Assignee: Volkswagen AG, Wolfsburg, Germany

[21] Appl. No.: 09/089,073

[22] Filed: Jun. 2, 1998

[30] Foreign Application Priority Data

Jun. 4, 1997 [DE] Germany ............................ 197 23 380

[51] Int. Cl.[7] ..................................................... F16C 17/02
[52] U.S. Cl. ............................ 384/294; 384/273; 384/502
[58] Field of Search ..................................... 384/294, 273, 384/502, 288, 503

[56] References Cited

U.S. PATENT DOCUMENTS

| | | | |
|---|---|---|---|
| 4,422,348 | 12/1983 | Campbell | 74/579 |
| 4,693,216 | 9/1987 | Ampferer et al. | 123/195 |

FOREIGN PATENT DOCUMENTS

| | | |
|---|---|---|
| 0068424 | of 0000 | European Pat. Off. . |
| 0696688 | of 0000 | European Pat. Off. . |
| 2938482 | of 0000 | Germany . |
| 2016094 | of 0000 | United Kingdom . |
| 2288436 | of 0000 | United Kingdom . |

*Primary Examiner*—Lenard A. Footland
*Attorney, Agent, or Firm*—Baker & Botts, L.L.P.

[57] ABSTRACT

A bearing arrangement which assures positive geometrical centering between two separately produced bearing components, preferably in internal combustion engines, includes a first bearing component provided with projections extending beyond a parting surface between the components and a second bearing component of lower hardness than the projections so that the projections displace the material of the second bearing component during assembly of the bearing arrangement.

11 Claims, 2 Drawing Sheets

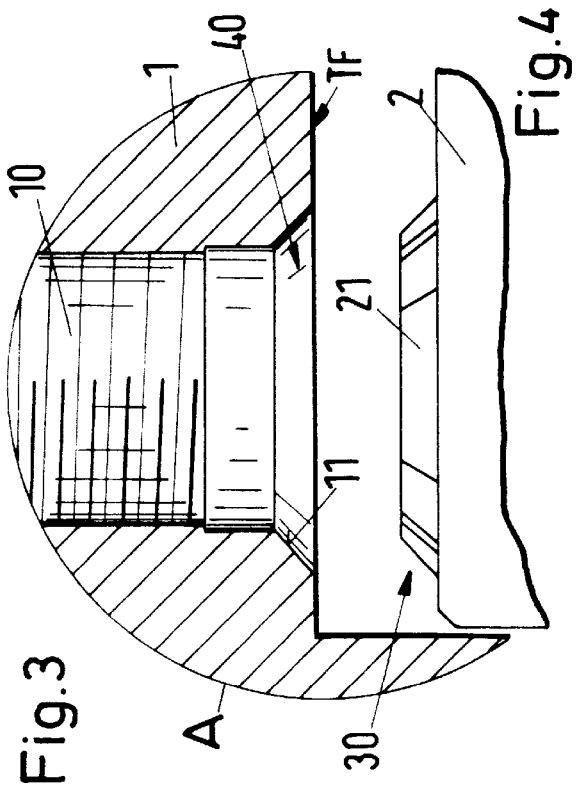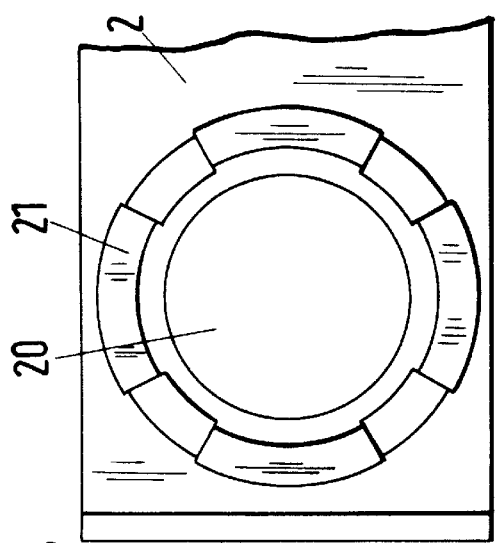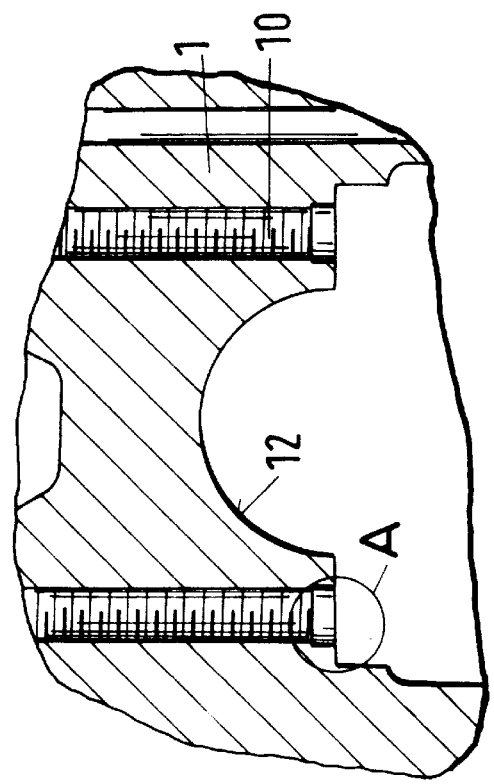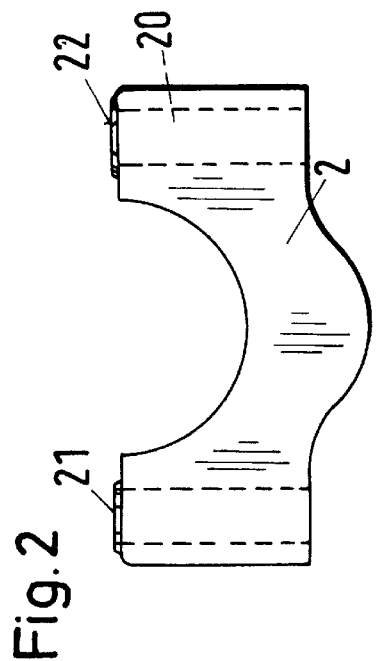

BEARING ARRANGEMENT AND METHOD FOR MAKING IT

BACKGROUND OF THE INVENTION

This invention relates to bearing arrangements and to methods for producing bearing arrangements.

In bearing arrangements consisting of two parts secured together, it is known to provide geometrical bearing attachments for the two bearing parts when used for a crankshaft, a camshaft and for connecting-rod bearings. For example, fitting pins or bolts are disclosed in FIGS. 4, 5 and 7 of British Patent No. 2,288,436, fitting surfaces of various contours extending in the axial direction of the bearing are disclosed in European Patent Publication No. 0 068 424; U.S. Pat. No. 4,422,348, German Patent No. 29 38 482; and in FIGS. 2, 3 and 6 of British Patent No. 2,288,436, and individual fracture contours are disclosed in European Patent Publication No. 0 696 688.

European Patent Publication No. 0 696 688 also discloses the manufacture of connecting rods from sintered material in which centering fitting surfaces are provided on both individually fabricated parts, or else, after fabrication in one piece, individual fracture contours are produced by controlled fracture of the bearing.

In general, it is known that bipartite bearings may be made of different materials, for example in crankshaft bearings in internal combustion engines. In this case, as disclosed in German Offenlegungsschrift No. 34 26 208, a cylinder block made of a light-metal carries one of the half-bearings while the corresponding bearing shells are made of gray cast iron.

These half-bearings made of different materials are positively connected by screws located on either side of the bearing centerline.

A bearing arrangement of this kind having a geometrical attachment for a centering arrangement is disclosed in U.S. Pat. No. 4,693,216. In this arrangement connection elements are located on either side of the bearing centerline for fixed attachment of two bearing segments and one of the bearing segments has circular sectors cooperating with conical surfaces to engage matching surfaces of the other bearing segment under elastic compression.

SUMMARY OF THE INVENTION

Accordingly, it is an object of the present invention to provide a bearing arrangement and a method of making it which overcome disadvantages after prior act.

Another object of the invention is to provide a bearing arrangement having positive geometrical centering between two separately produced half-bearings.

These and other objects of the invention are attained by providing a bearing arrangement having two parts joined along a parting surface in which at least one of the bearing parts has one or more projections extending beyond the parting surface so that, upon assembly of the bearing arrangement under applied force, the projections generate permanent impressions as a result of plastic deformations in the other bearing part, which has a lower material hardness at least in the regions engaged by the projections, to facilitate generation of permanent impressions.

With this arrangement, geometrical centering is achieved between the two bearing segments without requiring special parts or procedures. Any lateral shifting of the bearing parts relative to each other along the parting surface is prevented by the geometrical engagement of the parts. This is of considerable advantage, especially in the case of heavily stressed bearing devices, such as crankshaft bearings in high-compression internal combustion engines.

Preferably, provision is made so that the bearing segment provided with one or more projections is made integrally of a harder material than the material of the bearing segment in which the impressions are formed during assembly. In the case of a bearing for the mounting of a camshaft or a crankshaft or any other shaft in an internal combustion engine, this is preferably accomplished by using a cylinder head or a crankcase made of a light-metal alloy, in particular an aluminum or magnesium alloy, and making the bearing cover or bearing bridges for enclosing the shaft of a material having greater hardness, for example, a sintered material.

An especially simple and effective centering is preferably achieved by providing projections in the region of the apertures in the bearing segments which receive the connecting elements. In a particular embodiment, the projections are composed of several sectors, preferably arranged circularly around passage openings for screw connections for the parts of the bearing arrangement.

Depending on the extent of displacement of material resulting from plastic deformation during assembly, it may be preferable to provide the bearing part made of less hard material with preformed depressions before assembly in the region in which the impressions will be produced during assembly. In this way, the quantity of material to be displaced is reduced and, moreover, such preformed depressions provide spaces to accommodate the displaced material without deforming the parting surface.

In a further preferred embodiment, the projections are formed by a plurality of sectors which differ in shape and/or number. In a comparatively simple configuration, a plurality of sectors, preferably provided with a conical outer surface, may be grouped around a screw passage opening.

Alternatively, the projections may be formed in an essentially circular ring, preferably provided with a conical outer surface, with spaced sectors extending from the conical outer surface.

By virtue of the invention, unmistakable impressions are produced in simple manner in the light-metal crankcase of an internal combustion engine to provide a fixed seating for a corresponding bearing cover or bridge made of a harder material. Because a different number or different conformations of the projecting sectors within an individual bearing arrangement are used, positive coordination of the positions of the bearing parts is assured upon reassembly after the bearing arrangement has been disassembled.

BRIEF DESCRIPTION OF THE DRAWINGS

Further objects and advantages of the invention will be apparent from a reading of the following description in conjunction with the accompanying drawings, in which:

FIG. 1 is a fragmentary sectional view showing a representative embodiment of a first half-bearing for a bearing arrangement according to the invention, for example in a cylinder block of an internal combustion engine;

FIG. 2 is a side view showing a second half-bearing, for example a bearing cover, for the bearing arrangement.

FIG. 3 is a magnified view showing the portion of the first half-bearing designated A in FIG. 1;

FIG. 4 is a magnified view illustrating a detail of the second half-bearing;

FIG. 5 is a top view of the half-bearing shown in FIG. 4;

DESCRIPTION OF PREFERRED EMBODIMENTS

Figure 8:
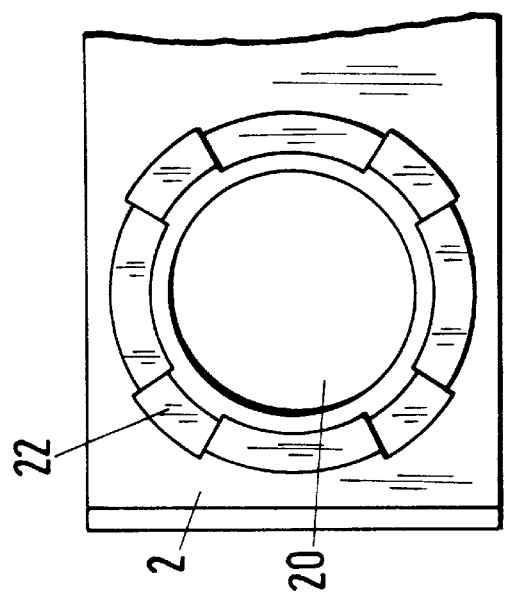
FIG. 8 is a top view of a third embodiment of a bearing part for a bearing arrangement according to the invention.

In the typical embodiment of the invention shown in FIG. 1, a first bearing segment is in the form of a half-bearing 1 formed, for example, in a light-metal cylinder block of an internal combustion engine. The half-bearing 1 comprises a bearing bore 12 and threaded holes 10 to receive screws (not shown) for fastening the second half-bearing 2, shown in FIG. 2, to the cylinder block. Alternately, instead of the threaded holes 10, passages for through bolts may be provided and nuts and bolts may be used to connect the half-bearings 1 and 2. The half-bearing 2 is in the form of a bearing cover and is provided with passages 20 which form openings to receive fastening screws. The second half-bearing 2 is made of a harder material than the first half-bearing 1, and is provided with projections 30 in the form of one or more spaced sectors 21, 22 or 23 of different sizes having cone-shaped surfaces around the apertures 13.

As shown in FIG. 3, the softer half-bearing 1 has a depression 40 formed by a preformed tapered groove 11 around the threaded hole 10, or it may be a hollow contour of smaller size but matching the sectors 21, 22 or 23, which are to be pressed against it under an applied force.

To produce unmistakable impressions in the first half-bearing 1 so as to provide a seating for the corresponding second half-bearing 2, the half-bearing 2, during an initial assembly and before the bearing bore 12 is machined, is pressed into the softer half-bearing 1 in the region of the groove 11, which is of smaller size than the sectors 21, 22 and 23. In this way, permanent impressions of the different size sectors 21, 22 and 23 are produced by plastic deformation and displacement of the softer material in the first half-bearing 1. FIG. 3 illustrates the details of the first half-bearing 1 and FIG. 4 shows the details of the second half-bearing 2 along the parting surface TF in the region of the screw passages. The preformed groove 11 in the first half-bearing 1 is shaped so that the material displaced by deformation under pressure will not deform the parting surface TF.

The second, harder, half-bearing 2 with its aperture 13 and conical sector 21 is also shown in top view in FIG. 5.

Figure 6:
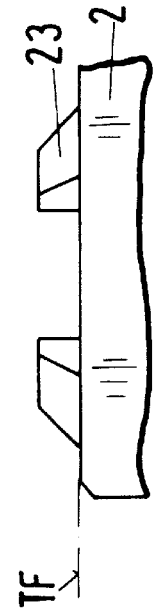
FIG. 6 is a fragmentary side view showing a detail of the second half-bearing of a second embodiment of the invention.
Figure 7:
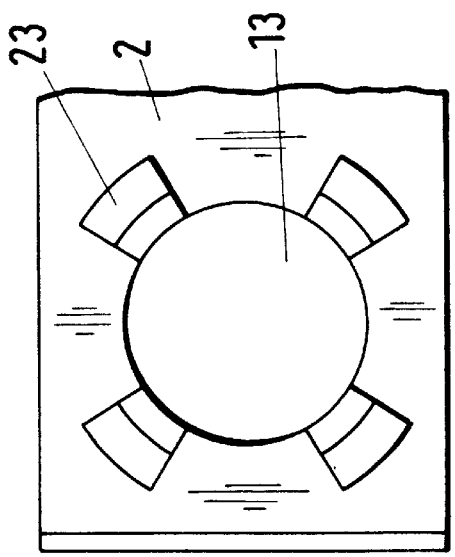
FIG. 7 is a top view of the bearing part shown in FIG. 6.

Advantageously, the sectors 21, 22 or 23 surrounding each aperture 13 in the harder half-bearing 2 are formed with different shapes and optionally different numbers as shown in FIGS. 5 to 8.

The half-bearings 2 for any one cylinder block are preferably provided with different combinations, e.g., 21 and 22; 21 and 23; or 22 and 23 of the sectors 21, 22 and 23.

Hence the second half-bearings 2 cannot be mistaken for each other, and, after first assembly, are coordinated with the corresponding first half-bearings 1, and inadvertent rotation of the half-bearings through 180° at installation is not possible.

The second half-bearing 2 is preferably a sintered part, produced as a single bearing cover or bridge precision-fitted and of high hardness.

Although the invention has been described herein with reference to specific embodiments, many modifications and variations therein will readily occur to those skilled in the art. Accordingly, all such variations and modifications are included within the intended scope of the invention.

I claim:

1. A bearing arrangement comprising:
   first and second bearing components which engage each other along a parting surface;
   connecting means on opposite sides of a bearing centerline for holding the bearing components together;
   at least one projection on the first bearing component which extends beyond the parting surface; and
   a region in the second bearing component adjacent to the at least one projection which has a lower hardness than the projection so that, when the first and second bearing components are assembled, the at least one projection forms permanent impressions in the region of lower hardness in the second bearing component.

2. A bearing arrangement according to claim 1 wherein the first bearing component is formed in a crankcase in an internal combustion engine and the second bearing component is a bearing cover.

3. A bearing arrangement according to claim 2 including a plurality of second bearing components formed in one piece and of integral material combined to form a bearing bridge on a crankcase.

4. A bearing arrangement according to claim 1 wherein that the at least one projection is located adjacent to an opening for accommodating the connecting means.

5. A bearing arrangement according to claim 1 wherein the second bearing component is made entirely of a material having lower hardness than the projection.

6. A bearing arrangement according to claim 1 wherein the second bearing component is provided before assembly with at least one preformed depression facing the at least one projection.

7. A bearing arrangement according to claim 1 wherein the first bearing component has a plurality of projections which comprise spaced sectors each having an extent perpendicular to the parting surface which is greater than the spacings between the sectors.

8. A bearing arrangement according to claim 7 wherein a plurality of projections are provided adjacent to each of two openings for accommodating the connecting means and wherein the plurality adjacent to one opening are of different shape or number from the plurality adjacent to the other opening.

9. A bearing arrangement according to claim 1 wherein the first bearing component is a sintered part.

10. A bearing arrangement according to claim 9 wherein the second bearing component is made of a light metal.

11. A bearing arrangement according to claim 10 wherein the light metal is selected from the group consisting of aluminum alloys and magnesium alloys.

\* \* \* \* \*